Nov. 12, 1968     H. BUSCH ET AL     3,410,503
DAMPING DEVICE FOR TOWED AIR TARGET BODIES
Filed Oct. 12, 1965
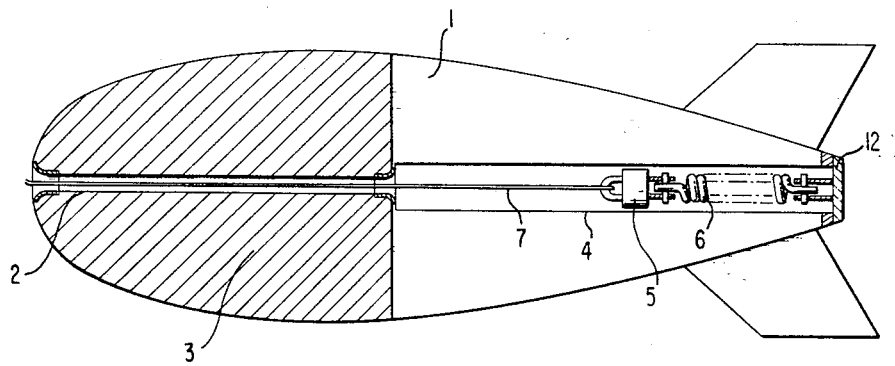
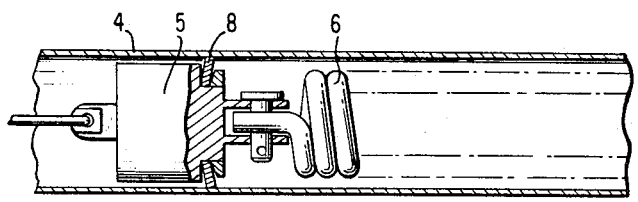
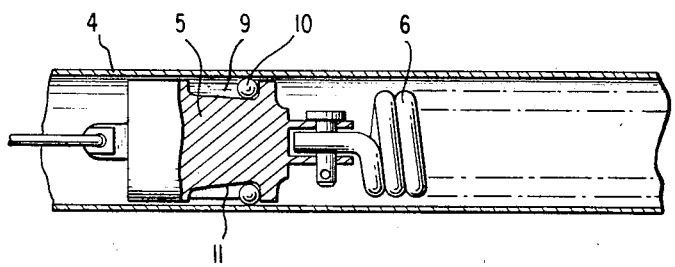
INVENTORS
HEINZ BUSCH
ALBERT DIETRICH
ERNST WIELAND

United States Patent Office 3,410,503
Patented Nov. 12, 1968

1

3,410,503
DAMPING DEVICE FOR TOWED AIR TARGET BODIES
Heinz Busch, Kressbronn, Albert Dietrich, Markdorf, and Ernst Wieland, Langenargen, Germany, assignors to Dornier System G.m.b.H., Friedrichshafen, Germany, a limited-liability corporation of Germany
Filed Oct. 12, 1965, Ser. No. 495,197
Claims priority, application Germany, Mar. 10, 1965, D 46,738
6 Claims. (Cl. 244—1)

ABSTRACT OF THE DISCLOSURE

A towed air target body has a damping device mounted therein adjacent the rear portion thereof. The damping device includes a resilient means connected between the rear portion of the body and a tow line. The resilient means in a first form of the invention comprises a spring which is stretched beyond its elastic limit by a maximum load. In a second form of the invention a resilient clamping plate is associated with the resilient means and is adapted to jam against an interior portion of the body in one direction of movement. In a third form of the invention means is associated with the resilient means and includes a plurality of balls adapted to be wedged against an interior portion of the body in one direction of movement.

---

This invention relates to a damping device for towed air target bodies which is employed to prevent the adverse effects of shocks or jolts on towing cables.

The towing cables for towed air target bodies, which latter will hereinafter be referred to as towed bodies, are very thin because of weight and aerodynamic drag considerations. An undesirable consequence is the sensitivity thereof to shocks or jolts, which may result in breakage or tearing of the cable. Broken cables result in a premature loss of the entire towed body. Further, the hit-indicating instruments or other sensitive apparatus accommodated in the towed body must be protected against shocks or jolts from the towing cable.

Shocks or jolting stresses may occur for various reasons during operation. For example, after the towing cable has been paid out or unreeled, the sudden stopping of the towing winch may cause the cable to break. In known methods of preventing this, the towing winch is braked prior to stopping or the towing cable is braked by means of a clamping device which is effective over the last few meters of cable paid out or unreeled. These devices are relatively complicated, expensive, and also can not prevent all of the shocks and jolts which occur during operation. Other shocks occur, for example, during drag-catching operations. Elastic Perlon cables or damping members are, therefore, preferably employed in this latter case by reducing the jolts or shocks. The disadvantages connected with the use of such cables are high air resistance and large overall dimensions required for Perlon cables of long towing lengths. If only short eleastic damping members are employed, an undesirable forwardly snapping or rapidly advancing motion is generally produced and the towing cable is overtaken by the towed body, which again produces undesirable jolts and shocks.

Towed target systems are known wherein the towed body and cable is paid out merely with the aid of a cable winch and the towing cable and the towed body are dropped when the training mission is completed. This method has the advantage that there is no need for complicated retaining devices for rewinding the cable or for driving means for the wind-up operation. In this system, the pay out winch and the towed body may be positioned at different points on the towing aircraft. Thus, it is possible to accommodate the pay out winch in the fuselage in a readily operable manner and without air resistance and to secure the towed body to a supporting surface with simple retaining means. In this manner, it is possible to maintain the space under the aircraft fuselage free and this space is often required for accommodating other devices, such as, for example, an outlet nozzle. Undesirable moments about the vertical axis, with the towed body being in the extended position, will not occur. An adverse result of this manner of mounting, however, is that shortly after the release of the towed body from the towing aircraft, a strong shock will generally be produced on the cable. The towed body, after the release thereof from the aircraft, is initially accelerated due to the air flow thereover and the end of the cable paid out laterally does not transmit any torsional moment to the towing winch at that time. After a period of free flight of the towed body, which depends on the length of the cable being paid out, the cable is suddenly drawn taut and the moment of inertia of the pay out winch which must be overcome results in a temporary high tension or stress on the cable.

In the present invention, the adverse effects of jolting stresses or shocks, particularly those which are produced after the towed body has been released from the towing aircraft, are prevented. Such maximum shocks and stresses generally occur only once during one mission. In the construction of the present invention, a resilient means having a backward movement check is employed to make the connection between the towing cable and the towed body. Such a resilient means may be, for example, a spiral spring which can be mounted in the rear of the towed body, for the purpose of eliminating air resistance and adverse effects on radar deflection devices. Particularly suitable for use in expendable devices is an under-dimensioned spiral spring which will be overstressed or stretched beyond the elastic limit thereof in the case of a shock or jolting stress.

Particular advantages of the damping system of the present invention, as compared to known devices, are the lightness and simplicity thereof, the low cost, which is important for expendable devices, as well as the excellent damping characteristics which are effective at the proper place.

The present invention will be further illustrated by reference to the accompanying drawings in which FIGURE 1 is a view in longitudinal section through a towed body showing a damping spring mounted in the rear end thereof, FIGURE 2 is a longitudinal sectional view through a backward movement checking means including a ring clamping plate, and FIGURE 3 is a longitudinal sectional view through another embodiment of a backward checking means showing a ball clamping device.

Referring to FIGURE 1, there is shown a towed body 1 having a central aperture or sleeve 2 therein of small cross-section extending through the working space 3. In the rear portion of the body, the aperture 2 widens and constitutes a guide sleeve 4 which has the purpose of guiding the sliding member 5 to which is secured, on one end, the spiral spring 6 and, on the other end, the towing cable 7. The rear portion of the damping spring 6 is connected to the closure plate 12 which is easily detachably secured to the towed body.

In the simplest embodiment, the resilience of the damping device is prevented by using an under-dimensioned spiral spring 6 which becomes stretched beyond the limit thereof upon the occurrence of the maximum load in the towed system. This principle is particularly advantageous in the case of expendable devices since a reaction- or feedback-free damping is thereby inexpensively achieved with the lowest possible requirements with respect to overall dimensions and weight.

The arrangement shown has the advantage that the damping device, being accommodated in the towed body, causes no air resistance whatsoever and the assembly may be made in a simple and rapid manner. The forward space or portion of the body is free to accommodate the useful load, which latter may consist of radar reflectors, for example angle reflectors or Luneberg lenses, or hit-evaluating instruments. The useful load is thus desirably positioned with respect to the center of gravity and there is no electromagnetic disturbing influence of the device by the damping portion.

In the embodiment shown in FIGURE 2, the resilience or return of the spring is prevented by a ring clamping plate 8 which is secured to the sliding member 5. When the spiral spring 6 is stretched, the ring clamping plate 8 bends and glides in the glide sleeve 4 with a small amount of friction. During subsequent contraction of the spring, the ring clamping plate 8 will be tightly wedged against the sleeve 4 as a result of frictional forces caused by the reduction of the curvature of the clamping plate.

Another embodiment of a mechanical checking means is illustrated in FIGURE 3. The grooves 9 which serve to receive the balls 10 are milled into the sliding member 5. The bottom portions of the grooves 9 are inclined, in the direction of movement of the sliding member 5, with respect to the longitudinal axis of the sleeve 4. During the expanding movement of the sliding member 5, the balls 10 glide freely since there is a sufficient amount of clearance betwen the balls and the sleeve 4. During the oppositely-directed or contracting movement, the balls are moved, as a result of frictional forces, onto the inclined portions 11 of the grooves 9 toward the narrowed or contracted portion of the latter and, thus, will be locked against the sleeve 4. In a simple variation of this construction, the sliding member 5 may be milled to a conical shape instead of being provided with the grooves 9 and may have a ball bearing race mounted thereon.

By appropriately dimensioning the ring clamping plate 8 in FIGURE 2, and by an appropriate choice of the wall material of the sleeve 4, which may be, for example, a softer metal or a braking material, a delayed backward motion may be achieved instead of a locking action so that the device may repeatedly dampen strong jolts or shocks during one mission. This also applies analogously to the embodiment shown in FIGURE 3, in case only a small number of grooves 9 or an equally soft material for the wall of the sleeve 4 is employed.

It will be obvious to those skilled in the art that many modifications may be made within the scope of the present invention without departing from the spirit thereof, and the invention includes all such modificatoins.

What is claimed is:

1. A damping device for a towed air target body comprising resilient means connecting the body and a tow, said resilient means being adapted to be extended by the tow and means associated with the resilient means whereby return movement of the resilient means from an extended position thereof is at least delayed.

2. A damping device according to claim 1 in which the means associated with the resilient means prevents return movement of the resilient means from an extended position thereof.

3. A damping device according to claim 1 in which the resilient means is secured to the interior of the body in the rear portion thereof.

4. A damping device according to claim 1 in which the resilient means is a spring which is stretched beyond the elastic limit thereof by a maximum load.

5. A damping device according to claim 1 in which the means associated with the resilient means is a clamping plate adapted to jam against an interior portion of the body.

6. A damping device according to claim 1 in which the means associated with the resilient means includes a plurality of balls adapted to be wedged against an interior portion of the body.

References Cited

UNITED STATES PATENTS

| | | | |
|---|---|---|---|
| 2,287,257 | 6/1942 | Lear | 244—1 |
| 2,407,634 | 9/1946 | Du Pont | 244—3 |
| 2,432,371 | 12/1947 | Berberich | 244—1 |

MILTON BUCHLER, *Primary Examiner.*

B. BELKIN, *Assistant Examiner.*